United States Patent
Liu et al.

(10) Patent No.: US 9,470,205 B2
(45) Date of Patent: Oct. 18, 2016

(54) WIND TURBINE BLADES WITH LAYERED, MULTI-COMPONENT SPARS, AND ASSOCIATED SYSTEMS AND METHODS

(71) Applicants: Qiang Liu, Fountain Valley, CA (US); Myles L. Baker, Long Beach, CA (US)

(72) Inventors: Qiang Liu, Fountain Valley, CA (US); Myles L. Baker, Long Beach, CA (US)

(73) Assignee: Vestas Wind Systems A/S, Aarhus (DK)

( * ) Notice: Subject to any disclaimer, the term of this patent is extended or adjusted under 35 U.S.C. 154(b) by 577 days.

(21) Appl. No.: 13/802,590

(22) Filed: Mar. 13, 2013

(65) Prior Publication Data
US 2014/0271198 A1  Sep. 18, 2014

(51) Int. Cl.
| F03D 1/06 | (2006.01) |
| F03D 1/00 | (2006.01) |
| B29C 70/52 | (2006.01) |
| B29L 31/08 | (2006.01) |
| B29C 65/48 | (2006.01) |
| B29C 65/00 | (2006.01) |

(52) U.S. Cl.
CPC ............ *F03D 1/0675* (2013.01); *F03D 1/001* (2013.01); *B29C 65/48* (2013.01); *B29C 66/1248* (2013.01); *B29C 66/43* (2013.01); *B29C 66/721* (2013.01); *B29C 70/52* (2013.01); *B29L 2031/085* (2013.01); *F05B 2240/302* (2013.01); *Y02E 10/721* (2013.01); *Y02E 10/728* (2013.01); *Y02P 70/523* (2015.11); *Y10T 29/49337* (2015.01)

(58) Field of Classification Search
CPC .............. F03D 1/0675; B29C 66/139; B29C 66/1248; B29C 66/712; B29C 66/73152; B29C 66/73521; B29C 66/7212; B29C 66/721; B32B 2307/542; B32B 2307/546; F05B 2240/302; B29L 2031/085
See application file for complete search history.

(56) References Cited

U.S. PATENT DOCUMENTS 5,375,324 A   12/1994  Wallace et al.
6,237,873 B1   5/2001  Amaoka et al.
(Continued)

FOREIGN PATENT DOCUMENTS

DE   102009040515 A1   3/2011
EP     1184566 A1     3/2002
(Continued)

OTHER PUBLICATIONS

"Wind Turbine Design;" Wikipedia, the free encyclopedia; <http://en.wikipedia.org/wiki/Wind_turbine_design> [accessed: Mar. 9, 2007}; pp. 1-8.
"Wind Turbine;" Wikipedia, the free encyclopedia; <http://en.wikipedia.org/wiki/Wind_turbine> [accessed: Mar. 9, 2007}; pp. 1-11.
Weber, Friedel; "How a High-Performance Sailplane is Manufactured;" DG-Flugzeugbau.de: Manufacturing a Sailplane, http://dg-flugzeugbau.de/flugzeug-bauene-e.html, accessed Oct. 22, 2008, 10 pages.
(Continued)

*Primary Examiner* — Thomas Denion
*Assistant Examiner* — Xiaoting Hu
(74) *Attorney, Agent, or Firm* — Perkins Coie LLP

(57) ABSTRACT

Wind turbine blades with layered, multi-component spars, and associated systems and methods are disclosed. A wind turbine blade system in accordance with a particular embodiment includes a first blade segment having a first spar element that includes first planks having a first thickness and a first plank composition, and a second blade segment having a second spar element that includes second planks having a second thickness and a second plank composition different than the first plank composition. The second blade segment is joined to the first blade segment at a joint, and, in particular embodiments, an overall product of thickness and elastic modulus of the first planks is approximately equal to an overall product of thickness and elastic modulus for the second planks.

17 Claims, 11 Drawing Sheets

(56) References Cited

U.S. PATENT DOCUMENTS

| | | | |
|---|---|---|---|
| 6,561,459 B2 | 5/2003 | Amaoka et al. | |
| 6,735,916 B2 | 5/2004 | Peshkam et al. | |
| 7,163,378 B2 | 1/2007 | Kildegaard | |
| 7,179,059 B2 | 2/2007 | Sorensen et al. | |
| 7,198,471 B2 | 4/2007 | Gunneskov et al. | |
| 7,322,798 B2 | 1/2008 | Cairo | |
| 7,351,040 B2 | 4/2008 | Livingston et al. | |
| 7,357,726 B2 | 4/2008 | Thorning | |
| 7,427,189 B2 | 9/2008 | Eyb et al. | |
| 7,438,533 B2 | 10/2008 | Eyb et al. | |
| 7,494,324 B2 | 2/2009 | Hibbard | |
| 7,503,752 B2 | 3/2009 | Gunneskov et al. | |
| 7,521,105 B2 * | 4/2009 | Bech | B29C 66/1162 416/229 R |
| 7,654,799 B2 | 2/2010 | Eyb | |
| 7,726,962 B2 | 6/2010 | Aramburu et al. | |
| 7,729,100 B2 | 6/2010 | Llorente Gonzalez et al. | |
| 7,731,882 B2 | 6/2010 | Bech et al. | |
| 7,740,453 B2 | 6/2010 | Zirin et al. | |
| 7,758,313 B2 | 7/2010 | Eyb | |
| 7,811,063 B2 | 10/2010 | Bonnet | |
| 7,883,321 B2 | 2/2011 | Bertelsen | |
| 7,891,947 B2 | 2/2011 | Chen et al. | |
| 7,895,746 B2 | 3/2011 | Bech et al. | |
| 7,901,188 B2 | 3/2011 | Llorente Gonzalez et al. | |
| 7,980,840 B2 | 7/2011 | Burchardt et al. | |
| 7,988,423 B2 * | 8/2011 | Hancock | F03D 1/0675 416/226 |
| 8,007,624 B2 | 8/2011 | Stiesdal | |
| 8,012,299 B2 | 9/2011 | Hancock | |
| 8,034,278 B2 | 10/2011 | Lopez | |
| 8,043,065 B2 | 10/2011 | Kyriakides | |
| 8,079,818 B2 | 12/2011 | Burchardt et al. | |
| 8,105,045 B2 | 1/2012 | Stewart | |
| 8,128,854 B2 | 3/2012 | Bech et al. | |
| 8,171,633 B2 | 5/2012 | Zirin et al. | |
| 8,191,255 B2 | 6/2012 | Kristensen et al. | |
| 8,206,531 B2 | 6/2012 | Portoles | |
| 8,221,085 B2 | 7/2012 | Livingston et al. | |
| 8,226,866 B2 | 7/2012 | Arelt | |
| 8,500,409 B2 | 8/2013 | Baker et al. | |
| 8,506,258 B2 | 8/2013 | Baker et al. | |
| 2005/0180853 A1 * | 8/2005 | Grabau | F03D 1/065 416/241 R |
| 2006/0247901 A1 | 11/2006 | Thorning | |
| 2007/0036659 A1 | 2/2007 | Hibbard | |
| 2007/0107220 A1 | 5/2007 | Bakhuis et al. | |
| 2007/0189903 A1 * | 8/2007 | Eyb | F03D 1/065 416/230 |
| 2007/0251090 A1 | 11/2007 | Breugel et al. | |
| 2008/0069699 A1 * | 3/2008 | Bech | B29C 66/20 416/229 R |
| 2008/0145615 A1 | 6/2008 | Jacobsen et al. | |
| 2008/0181781 A1 | 7/2008 | Livingston et al. | |
| 2008/0206062 A1 * | 8/2008 | Sanz Pascual | F03D 1/0675 416/226 |
| 2008/0277053 A1 | 11/2008 | Stiesdal | |
| 2009/0035517 A1 | 2/2009 | Bech | |
| 2009/0140527 A1 | 6/2009 | Pawar et al. | |
| 2009/0146433 A1 | 6/2009 | Althoff et al. | |
| 2009/0148300 A1 | 6/2009 | Driver et al. | |
| 2009/0196756 A1 | 8/2009 | Althoff | |
| 2009/0208341 A1 * | 8/2009 | Llorente Gonzalez | F03D 1/0675 416/223 R |
| 2009/0246033 A1 | 10/2009 | Rudling | |
| 2009/0317585 A1 | 12/2009 | Bech | |
| 2010/0062238 A1 | 3/2010 | Doyle et al. | |
| 2010/0068065 A1 | 3/2010 | Jensen | |
| 2010/0071209 A1 | 3/2010 | Moller | |
| 2010/0090472 A1 | 4/2010 | Berthelsen | |
| 2010/0136278 A1 | 6/2010 | Cadd et al. | |
| 2010/0143145 A1 | 6/2010 | Jones | |
| 2010/0143147 A1 * | 6/2010 | Akhtar | F03D 1/0675 416/241 R |
| 2010/0166998 A1 | 7/2010 | Bannister et al. | |
| 2010/0226775 A1 | 9/2010 | Hartman | |
| 2010/0260611 A1 | 10/2010 | Rudling | |
| 2010/0260612 A1 | 10/2010 | Vasudeva et al. | |
| 2010/0272570 A1 | 10/2010 | Arocena De La Rua et al. | |
| 2010/0304170 A1 * | 12/2010 | Frederiksen | B29C 65/40 428/542.8 |
| 2010/0314028 A1 | 12/2010 | Hedges et al. | |
| 2011/0020131 A1 | 1/2011 | Petersen et al. | |
| 2011/0031758 A1 | 2/2011 | Mitsuoka et al. | |
| 2011/0031759 A1 | 2/2011 | Mitsuoka et al. | |
| 2011/0037190 A1 | 2/2011 | Stiesdal | |
| 2011/0044820 A1 | 2/2011 | Stenbaek Nielsen et al. | |
| 2011/0049770 A1 | 3/2011 | Stiesdal | |
| 2011/0052403 A1 | 3/2011 | Kawasetsu et al. | |
| 2011/0073237 A1 | 3/2011 | Rajasingam | |
| 2011/0084496 A1 | 4/2011 | Kuroiwa | |
| 2011/0091326 A1 | 4/2011 | Hancock | |
| 2011/0091684 A1 | 4/2011 | Holloway | |
| 2011/0097211 A1 | 4/2011 | Rudling | |
| 2011/0103962 A1 | 5/2011 | Hayden et al. | |
| 2011/0103964 A1 | 5/2011 | Bech | |
| 2011/0114252 A1 | 5/2011 | Partington et al. | |
| 2011/0135485 A1 | 6/2011 | Wang | |
| 2011/0142663 A1 | 6/2011 | Gill | |
| 2011/0146896 A1 | 6/2011 | Schibsbye | |
| 2011/0171034 A1 | 7/2011 | Whiter | |
| 2011/0200444 A1 | 8/2011 | Garcia | |
| 2011/0229336 A1 | 9/2011 | Richter et al. | |
| 2011/0243750 A1 | 10/2011 | Gruhn et al. | |
| 2012/0067515 A1 | 3/2012 | Dahl et al. | |
| 2012/0211637 A1 | 8/2012 | Christiansen et al. | |
| 2014/0037455 A1 * | 2/2014 | Dahl | F03D 1/0675 416/223 R |
| 2014/0154091 A1 | 6/2014 | Baker et al. | |

FOREIGN PATENT DOCUMENTS

| | | |
|---|---|---|
| EP | 1806285 | 7/2007 |
| EP | 1878915 | 1/2008 |
| EP | 1965074 | 9/2008 |
| EP | 2033769 A1 | 3/2009 |
| EP | 2264310 A2 | 12/2010 |
| EP | 2368699 A1 | 9/2011 |
| FR | 2588822 | 4/1987 |
| GB | 247784 A | 2/1926 |
| WO | WO-03078832 A1 | 9/2003 |
| WO | WO-03078833 A1 | 9/2003 |
| WO | WO-2004050337 A1 | 6/2004 |
| WO | WO-2004078461 A1 | 9/2004 |
| WO | WO-2004078462 | 9/2004 |
| WO | WO-2006002621 | 1/2006 |
| WO | WO-2006016089 A1 | 2/2006 |
| WO | WO-2006061617 | 6/2006 |
| WO | WO-2006082479 A1 | 8/2006 |
| WO | WO-2009059604 A1 | 5/2009 |
| WO | WO-2010065928 A1 | 6/2010 |
| WO | WO-2010135737 A1 | 11/2010 |
| WO | WO-2011117546 A1 | 9/2011 |
| WO | WO-2011149990 A2 | 12/2011 |

OTHER PUBLICATIONS

Nettles A., "Basic Mechanics of Laminated Composite Plates," NASA Reference Publication 1351, Marshall Space Flight Center, Alabama, Oct. 1994, 104 pages.

International Search Report and Written Opinion for International Application No. PCT/DK2014/050053, Applicant: Vestas Wind Systems A/S, mailed May 28, 2014, 13 pages.

* cited by examiner

WIND TURBINE BLADES WITH LAYERED, MULTI-COMPONENT SPARS, AND ASSOCIATED SYSTEMS AND METHODS

TECHNICAL FIELD

The present technology is directed generally to wind turbine blades with layered, multi-component spars, and associated systems and methods.

BACKGROUND

As fossil fuels become scarcer and more expensive to extract and process, energy producers and users are becoming increasingly interested in other forms of energy. One such energy form that has recently seen a resurgence is wind energy. Wind energy is typically harvested by placing a multitude of wind turbines in geographical areas that tend to experience steady, moderate winds. Modern wind turbines typically include an electric generator connected to one or more wind-driven turbine blades, which rotate about a vertical axis or a horizontal axis.

In general, larger (e.g., longer) wind turbine blades produce energy more efficiently than do short blades. Accordingly, there is a desire in the wind turbine blade industry to make blades as long as possible. However, long blades create several challenges. For example, long blades are heavy and therefore have a significant amount of inertia, which can reduce the efficiency with which the blades produce energy, particularly at low wind conditions. In addition, long blades are difficult to manufacture and in many cases are also difficult to transport. Accordingly, a need remains for large, efficient, lightweight wind turbine blades, and suitable methods for transporting and assembling such blades.

DETAILED DESCRIPTION

The present disclosure is directed generally to efficient wind turbine blades, including segmented wind turbine blades connected with joined, multi-component spars and associated systems and methods of manufacture, assembly, and use. Several details describing structures and/or processes that are well-known and often associated with wind turbine blades are not set forth in the following description to avoid unnecessarily obscuring the description of the various embodiments of the disclosure. Moreover, although the following disclosure sets forth several representative embodiments, several other embodiments can have different configurations and/or different components than those described in this section. In particular, other embodiments may have additional elements and/or may lack one or more of the elements described below with reference to FIGS. 1-8. In FIGS. 1-8, many of the elements are not drawn to scale for purposes of clarity and/or illustration. In several instances, elements referred to individually by a reference number followed by a letter (e.g., 117a, 117b, 117c) are referred to collectively and/or generically by the reference number without the letter (e.g., 117).

Figure 1:
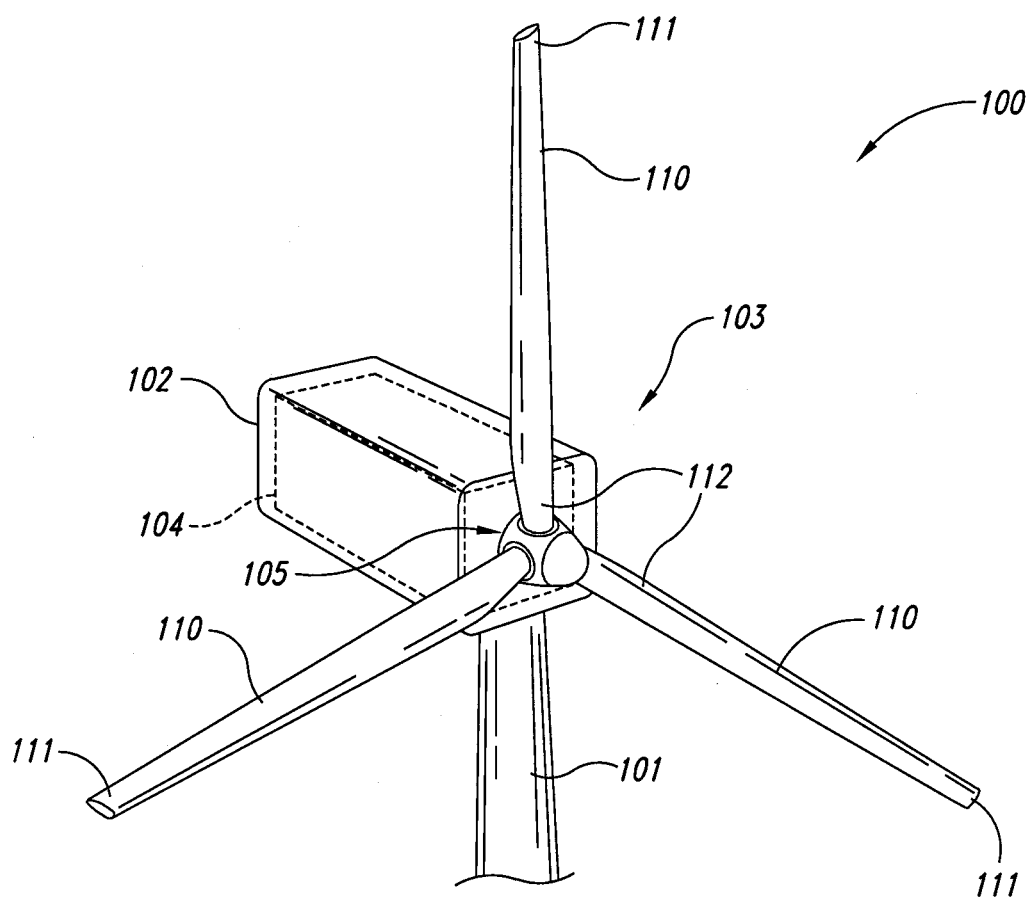
FIG. 1 is a partially schematic, isometric illustration of a wind turbine system having blades configured in accordance with an embodiment of the present technology.

FIG. 1 is a partially schematic, isometric illustration of an overall system 100 that includes a wind turbine 103 having blades 110 configured in accordance with an embodiment of the disclosure. The wind turbine 103 includes a tower 101 (a portion of which is shown in FIG. 1), a housing or nacelle 102 carried at the top of the tower 101, and a generator 104 positioned within the housing 102. The generator 104 is connected to a shaft or spindle having a hub 105 that projects outside the housing 102. The blades 110 each include a hub attachment portion 112 (e.g., a root section) at which the blades 110 are connected to the hub 105, and a tip 111 positioned radially or longitudinally outwardly from the hub 105. In an embodiment shown in FIG. 1, the wind turbine 103 includes three blades connected to a horizontally-oriented shaft. Accordingly, each blade 110 is subjected to cyclically varying loads as it rotates among the 12:00, 3:00, 6:00 and 9:00 positions, because the effect of gravity is different at each position. In other embodiments, the wind turbine 103 can include other numbers of blades connected to a horizontally-oriented shaft, or the wind turbine 103 can have a shaft with a vertical or other orientation. In any of these embodiments, the blades can have structures configured in accordance with the arrangements described in further detail below with reference to FIGS. 2-8.

Figure 2:
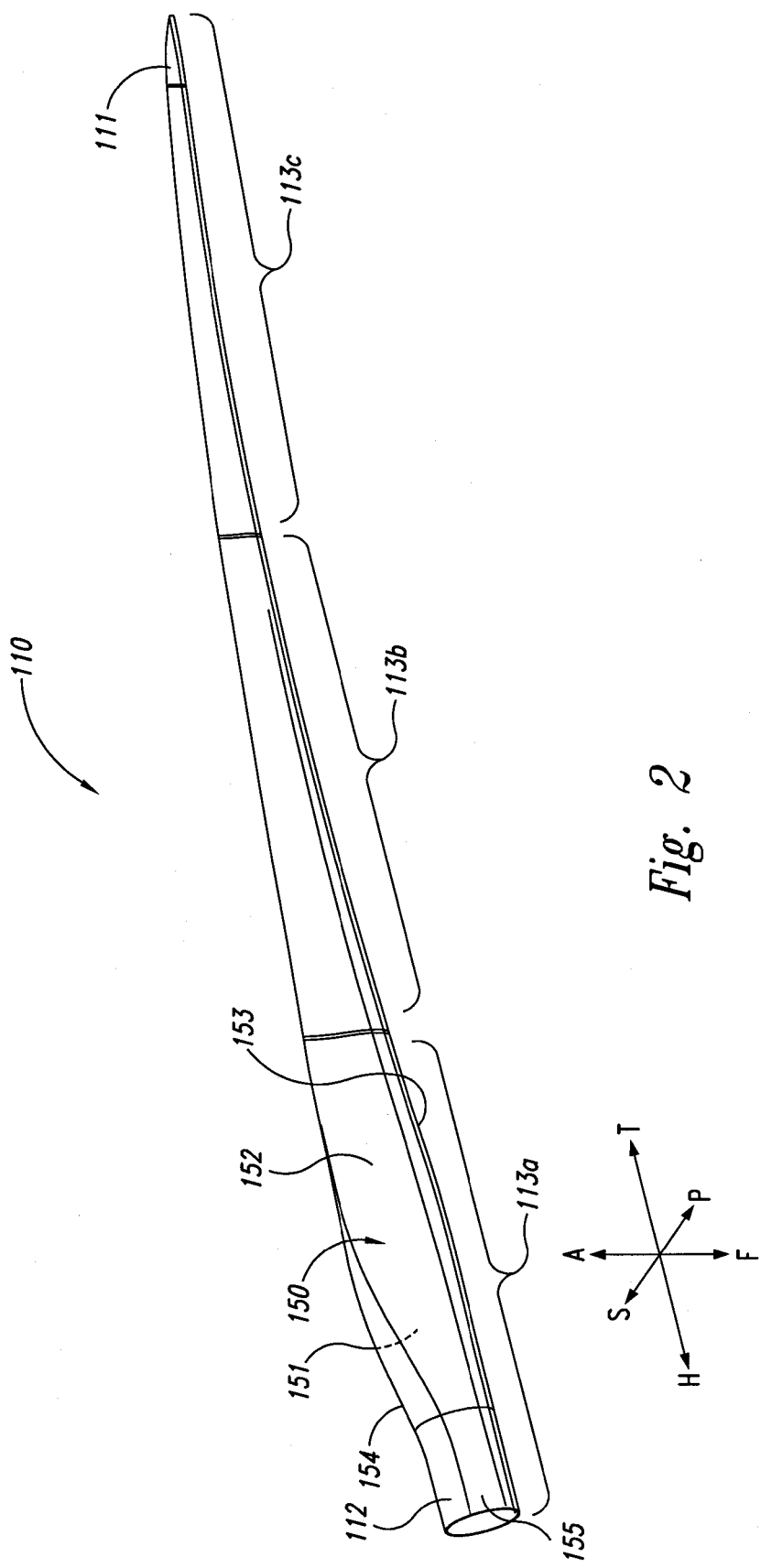
FIG. 2 is a partially schematic, isometric illustration of a wind turbine blade configured in accordance with an embodiment of the present technology.

FIG. 2 is a partially schematic, isometric illustration of a representative one of the blades 110 described above with reference to FIG. 1. The blade 110 includes multiple segments 113, for example, a first segment 113a, a second segment 113b, and a third segment 113c. The segments extend along a spanwise, longitudinal, or axial axis from the hub attachment portion 112 to the tip portion 111. The spanwise axis is represented in FIG. 2 as extending in a hub direction H and a tip direction T. The blade 110 also extends along a thickness axis in a pressure direction P and a suction direction S, and further extends along a chordwise axis in a forward direction F and an aft direction A. The outer surface of the blade 110 is formed by a skin 150 that can include several skin sections. The skin sections can include a suction side skin 151, a pressure side skin 152, a leading edge skin 153, a trailing edge skin 154, and an attachment portion skin 155. The internal structure of the blade 110, the connections between the internal structure and the skin 150, and the connections between neighboring segments 113 are described further below with reference to FIGS. 3-8.

Figure 3:
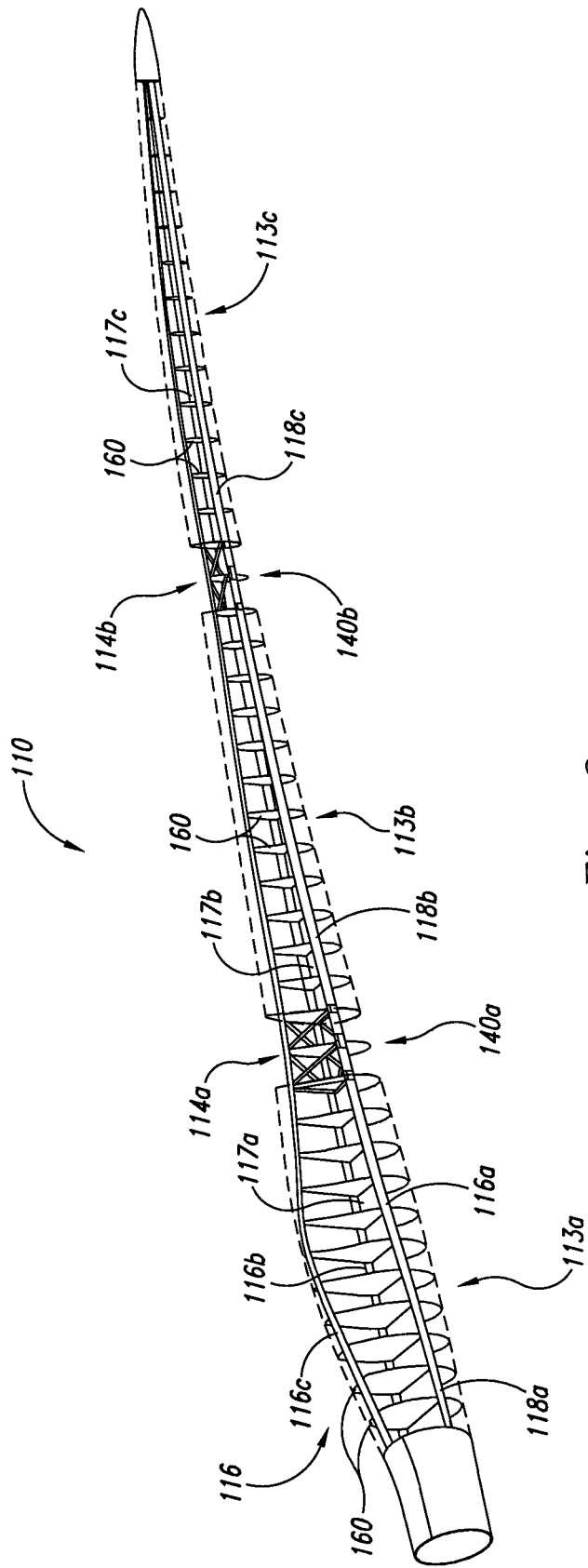
FIG. 3 is an illustration of an embodiment of the wind turbine blade shown in FIG. 2, with portions of the outer skin of the blade removed and/or translucent for purposes of illustration.

FIG. 3 illustrates a particular embodiment of the blade 110 with portions of the skin removed or translucent for purposes of illustration. In this embodiment, the blade 110 includes multiple ribs 160 located at each of the segments 113a, 113b and 113c. The ribs 160 are connected to multiple spars, e.g., three spars 116 (shown as a first spar 116a, a second spar 116b, and a third spar 116c) that extend along the length of the blade 110. Accordingly, each of the spars 116 includes a first spar portion 118a at the first segment 113a, a second spar portion 118b at the second segment 113b, and a third spar portion 118c at the third segment 113c. Each segment 113 also includes a corresponding shear web 117, illustrated as a first shear web 117a, a second shear web 117b, and a third shear web 117c. The spar portions 118 in neighboring sections 113 are connected at two connection regions 114a, 114b to transmit loads from one segment 113 to the next. In a particular embodiment, the shear webs 117 are not continuous across the connection regions 114. Instead, truss structures 140 (shown as a first truss structure 140a and a second truss structure 140b) at each connection region 114 are connected between neighboring segments 113 to transmit shear loads from one segment 113 to the next. In other embodiments, the ribs 160 can be omitted, and/or the blade 110 can have a different number or arrangement of spars 116, and/or the truss structure 140 can be omitted, and/or the shear webs 117 can be continuous across the connection region 114. Further details of representative truss structures for connecting neighboring blade segments are described in co-pending U.S. patent application Ser. No. 13/683,690, filed on Nov. 21, 2012 and incorporated herein by reference. To the extent the foregoing application and/or any other materials incorporated herein by reference conflict with the present disclosure, the present disclosure controls. Further details of arrangements connecting the spars at the connection regions are described below with reference to FIGS. 4A-8.

Figure 4A:
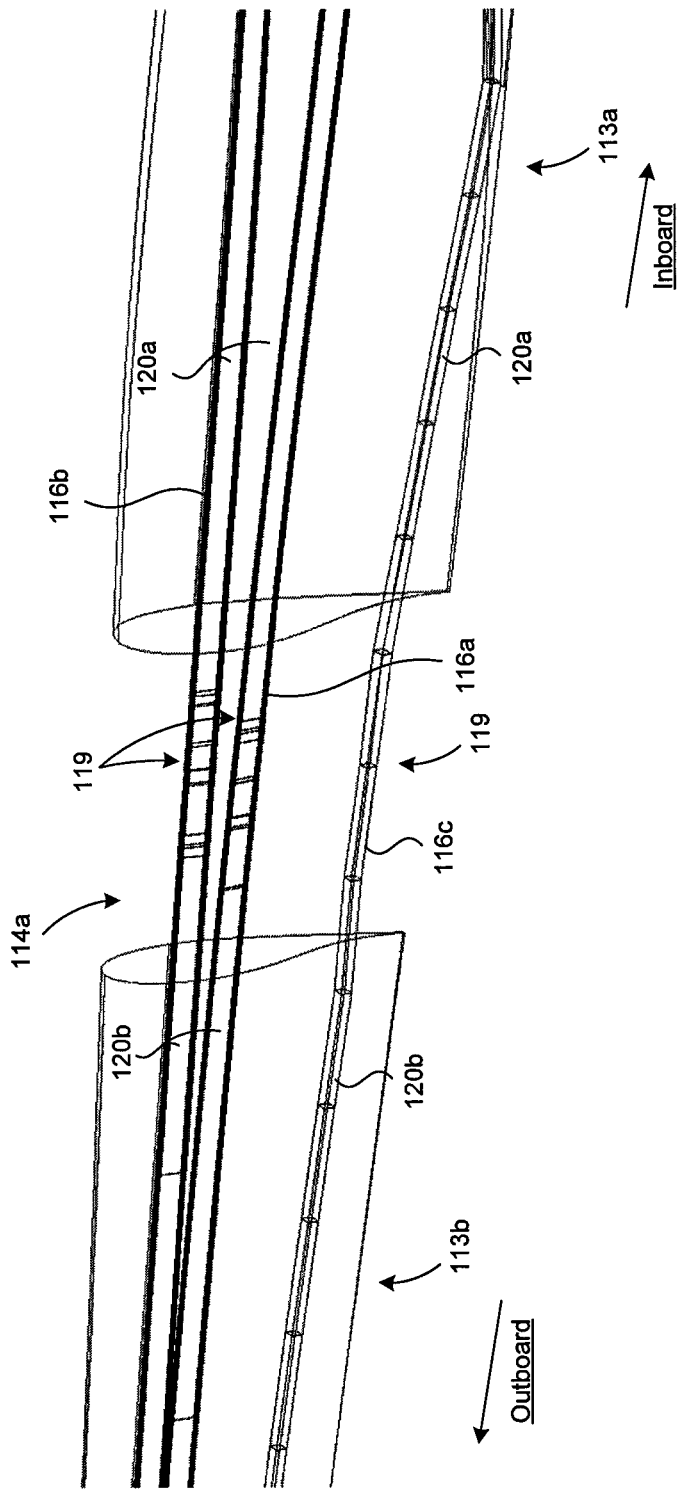
FIGS. 4A and 4B are partially schematic, isometric illustrations of respective portions of a wind turbine blade, illustrating spar joints between spar elements in accordance with embodiments of the present technology.

FIG. 4A is partially schematic, isometric illustration of a representative first connection region 114a shown in FIG. 3, with spar joints 119 configured in accordance with an embodiment of the present technology to connect the first and second blade segments 113a, 113b. The spar joints 119 are used to transmit loads from the second segment 113b and other outboard regions of the blade to the first portion 113a and the hub 105 (FIG. 1). In a particular embodiment shown in FIG. 4A, those loads are transmitted primarily by the three spars 116a-116c described above with reference to FIG. 3. Each of these spars includes multiple elements, for example, a first spar element 120a and a second spar element 120b that is attached to the first spar element 120a at a spar joint 119. A similar arrangement can be used to join the spar elements at the second connection region 114b shown in FIG. 3.

Figure 4B:
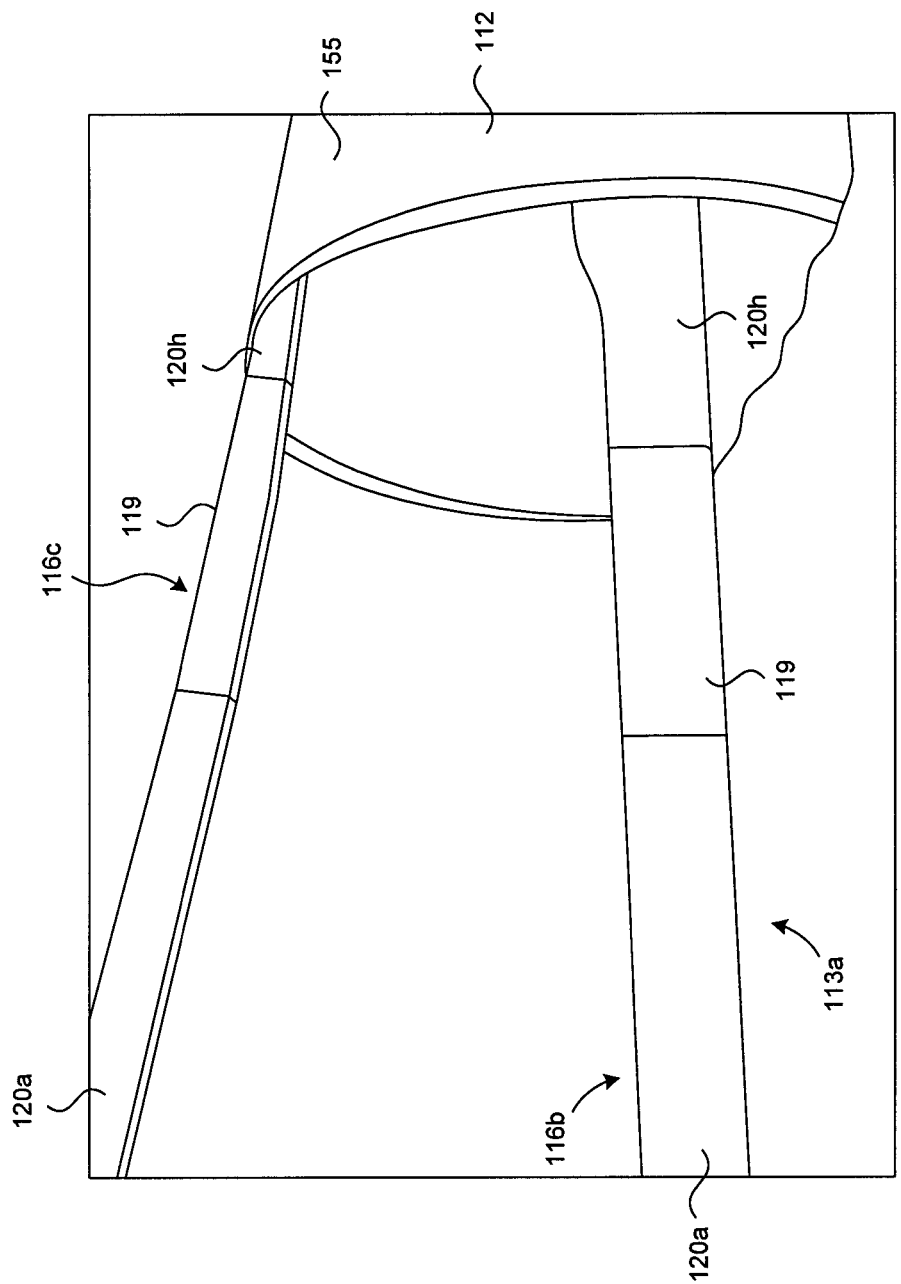

In other embodiments, joints generally similar to those shown in FIG. 4A can be used at other locations along the length of the wind turbine blade, inboard and/or outboard of the location shown in FIG. 4A. As shown in FIG. 4B, for example, such a joint can be used at or close to the hub attachment portion 112. In a particular embodiment, the hub attachment portion 112 is pre-manufactured with three hub spar elements 120h (two of which are visible in FIG. 4B) projecting outwardly from the attachment portion skin 155. The first spar elements 120a are then attached to the hub spar elements 120h at corresponding spar joints 119, prior to manufacturing the rest of the first segment 113a. In other embodiments, the remaining outboard portion of the first segment 113a can be pre-manufactured and coupled to the hub attachment portion 112. In either embodiment, the resulting first segment 113 includes spar joints 119 between the inboard hub spar elements 120h and the corresponding outboard first spar elements 120a.

Figure 5:
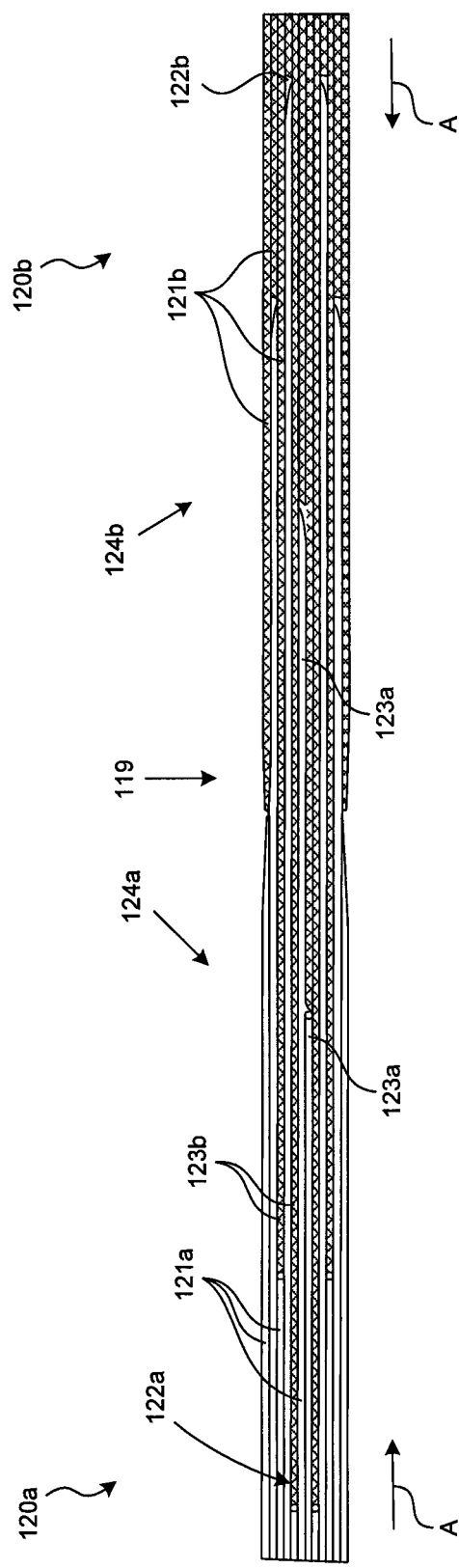
FIG. 5 is a partially schematic, isometric illustration of a spar joint configured in accordance with an embodiment of the present technology.

FIG. 5 is a partially schematic, side isometric illustration of a representative first spar element 120a attached to a representative second spar element 120b at a spar joint 119. The first spar element 120a includes a first end portion 124a, and the second spar element 120b includes a second end portion 124b. The two end portions 124a, 124b are interleaved and bonded to each other at the spar joint 119. Accordingly, the first spar element 120a can include first planks 121a that terminate at different axial locations in a staggered manner to form first recesses 122a (e.g., with different depths) and first projections 123a (e.g., with different lengths). The second spar element 120b includes second planks 121b having staggered ends that form second recesses 122b and second projections 123b. The first recesses and projections 122a, 123a are sized and positioned to be complementary to the second recesses and projections 122b, 123b, so that when the spar elements 120a, 120b are brought together (as indicated by arrows A), the first projections 123a are received in the second recesses 122b, and the second projections 123b are received in the first recesses 122a. The resulting joint (e.g., a "finger" type joint) is then bonded with an adhesive to form a load-bearing structure configured to carry the major loads in the spar. Further details of representative joints are described in co-pending published PCT application WO2011/149990, which is incorporated herein by reference.

For purposes of illustration, the spar elements are shown as including planks, and in particular embodiments, the planks are manufactured as pultrusions. In other embodiments, the planks (and/or other suitable structures) can include an infusion or a pre-preg construction. In further particular embodiments, such a plank or other structure can be formed as a unitary piece instead of as a bonded stack of pieces.

The first planks 121a and the second planks 121b can have different compositions that are selected in a manner that increases the efficiency and/or reduces the weight of the resulting blade. For example, the first planks 121a can be selected from a relatively inexpensive material (e.g., fiberglass) that has sufficient strength to carry the bending loads typical of locations close to the blade root. The more outboard second planks 121b can be formed from a lighter, higher performance material that may be more expensive than the material included in the first planks 121a, but has a lighter weight. Accordingly, the resulting blade has less mass further away from the hub. This in turn reduces gravity loading, which can be a driver for hub design. The result is that the inboard portion of the blade, the hub, and the rest of the turbine can be designed to withstand lower loads.

In particular embodiments, if the second planks 121b are made of higher performance materials than the first planks 121a, it is advantageous to reduce the thickness of the second planks 121b, which can result In a lighter structure while still maintaining adequate strength and stiffness, in order to reduce the weight and cost of the blade. In particular, the second planks 121b can be formed from a material having a higher elastic modulus E or a higher strength S than that of the material forming the first plank 121a. This allows the designer to reduce the thickness of the second planks 121b while maintaining sufficient overall strength and stiffness. However, the thinner second planks 121b can be difficult to integrate with the thicker first planks 122a when joining the two spar elements 120a, 120b. Further details of arrangements for addressing this issue are described below with reference to FIGS. 6A-8.

Figure 6A:
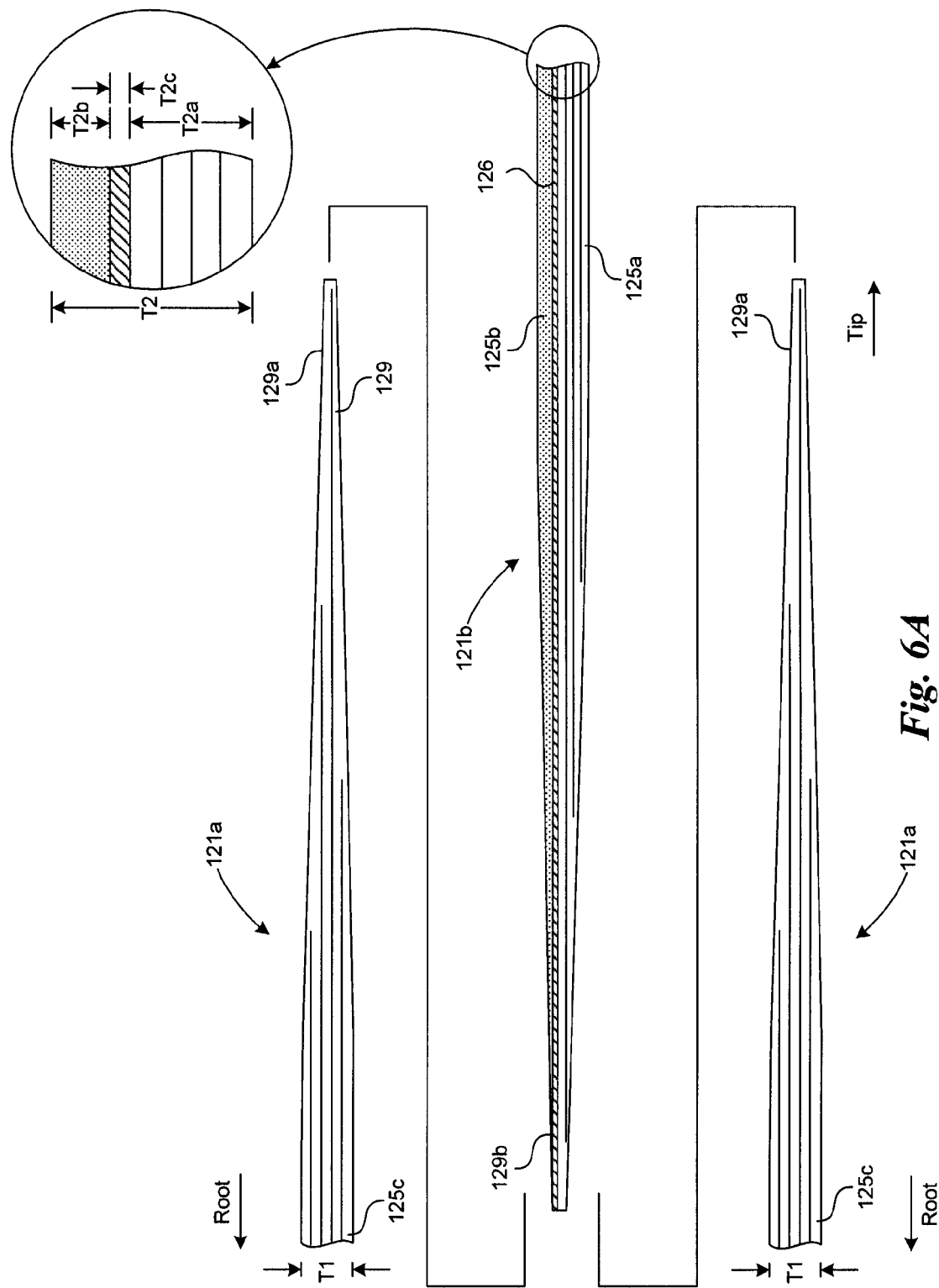
FIG. 6A is a partially schematic, side elevation view of an arrangement of planks from the spar elements shown in FIG. 5.

FIG. 6A is a partially exploded illustration of the ends of two representative first planks 121a and the end of a representative second plank 121b during an intermediate assembly stage, with a gap or recess between their respective tips 129a. The second plank 121b fits into the gap or recess. The first planks 121a can have an overall thickness T1, and the second plank 121b can have an overall thickness T2 that is approximately equal to the overall thickness T1 of the first plank 121a. The second plank 121b can include a composite of multiple materials, e.g., a first material forming one or more first layers 125a (each of which can include multiple plies), a second material forming one or more second layers 125b (each of which can include multiple plies), and an adhesive 126 that joins the first layer 125a to the second layer 125b. In some embodiments the adhesive 126 may be omitted due to the method of construction of the layers 125a and 125b. The first planks 121a can include one or more third layers 125c (each of which can include multiple plies) formed from a material that can be different than the materials forming either the first layers 125a or the second layers 125b. Because the second plank 121b is formed from multiple layers having different compositions, the overall thickness T2 can include a first thickness T2a of the one or more first layers 125a, a second thickness T2b of the one or more second layers 125b, and a third thickness T2c of the adhesive 126. In at least some embodiments, the thickness of the adhesive 126 can be small and/or insignificant relative to the thicknesses of the other layers. By forming the first planks 121a and the second plank 121b to have equal overall thicknesses T1, T2, the arrangement of projections and recesses described above with reference to FIG. 5 can be symmetrical from the first spar element 120a to the second spar element 120b, even though the materials forming these spar elements may be different.

In a particular embodiment, the layers (the first and/or second layers 125a, 125b) of the second plank 121b are selected so that a product of the combined or overall thickness T2 and the combined or overall second modulus of elasticity, E2, is approximately the same as the product of the thickness T1 and the first modulus E1 of the first plank 121a. In cases for which T1=T2, the combined or overall second modulus E2 of the materials forming the second planks 121b is equal to the first modulus E1 of material forming the first plank 121a. This arrangement is expected to more uniformly transfer loads between the first and second planks, and/or to reduce the likelihood for delamination or other failures at the joint between the two planks 121a, 121b.

In a typical installation, the modulus E of the second layer 125b is larger than that of the third layer 125c, although its thickness is less. To keep the product of thickness×modulus approximately the same for both planks 121, the relative thicknesses T2a and T2b can be adjusted to find an improved (e.g., optimum) solution that offers a good combination of strength, stiffness, and manufacturability. In this case the function of the first layer 125a of the second plank 121b can be to provide additional thickness (e.g., so that T1 is approximately equal to T2) without adding too much to the combined elastic modulus of the combined layers. In a representative embodiment, the first layer 125a includes biaxial fiberglass, and the second layer 125b includes a carbon fiber composite. In a further aspect of this embodiment, the first layer 125a can have a thickness of about 4 mm, the second layer 125b can have a thickness of about 1.8 mm, and the adhesive 126 can have a thick of about 0.76 mm, producing a combined overall thick T2 of 6.6 mm. In still a further particular aspect of this embodiment, the third layer 125c of the first plank 121a can have a composition (e.g., unidirectional fiberglass) with an elastic modulus E1 that is between the elastic moduli of the first layer 125a and the second layer 125b of the second plank 121b.

Figure 6B:
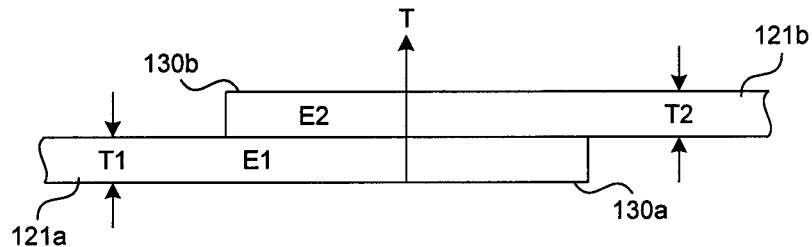
FIGS. 6B-6G illustrate overlapping planks, layers and associated shear stress levels for pairs of materials in accordance with embodiments of the present technology.

FIGS. 6B-6G illustrate representative overlapping planks formed from a variety of different materials, along with associated graphs indicating shear stress as a function of thickness through the planks. FIG. 6B illustrates a first plank 121a overlapping with and adjacent to a second plank 121b, with both planks formed from the same material, having a representative elastic modulus E1 and E2 of $10^7$ psi. The thickness of the first plank 121a is T1 and the thickness of the second plank 121b is T2. In this particular embodiment, T1 and T2 are equal at 0.25 inches. Accordingly, the product of E1×T1 is equal to the product of E2×T2, e.g., $2.5×10^6$ lb/in.

Figure 6C:
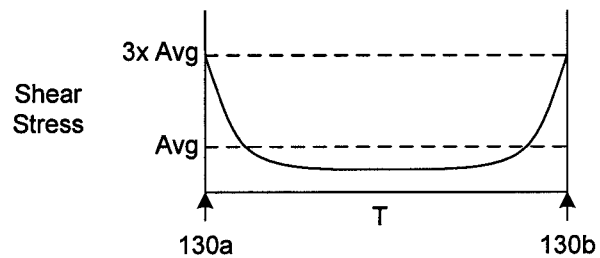

FIG. 6C is a graph illustrating representative shear stress values as a function of thickness T through the two planks once they are bonded to each other. Accordingly, the graph illustrates the shear stress from a lower or first edge 130a of the first plank 121a through an upper or second edge 130b of the second plank 121b. As shown in FIG. 6C, the peak shear stress values (at the first and second edges, respectively) are significantly higher than the average shear stress value through the overlapped planks. In FIG. 6C this is shown as three times the average for clarity, but for the graphs shown in FIG. 6C as well as FIGS. 6E and 6G, the numerical values of the peaks are only presented as examples to illustrate the concept, and in other embodiments, the peak stresses can have other values. In addition, the graphs in FIGS. 6C, 6E and 6G neglect the effects of varying the configuration (e.g., geometry) of the tips of the planks (e.g., by chamfering and/or other techniques) to reduce the magnitude of stress peaks. Such techniques can be applied in conjunction with the technology features described herein.

Figure 6D:
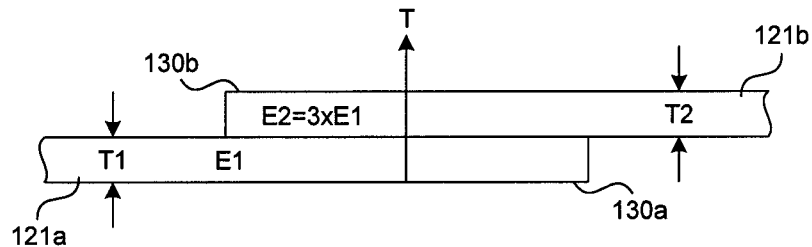
Figure 6E:
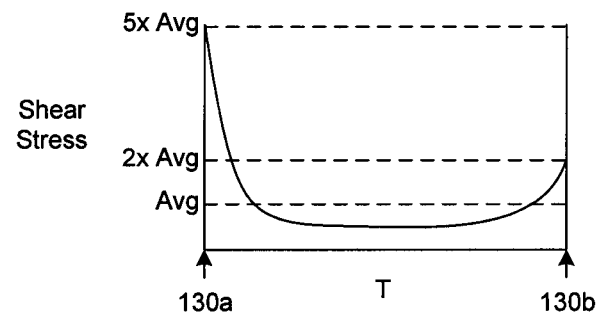

In FIG. 6D, the first and second planks 121a, 121b again have the same thickness (0.25 inches), but the second plank 121b has a modulus of elasticity E2 that is three times the modulus of elasticity E1 of the first plank 121a. Referring next to FIG. 6E, the resulting shear stress curve indicates that the maximum shear stress at the first edge 130a of the overlapped planks is now five times the average shear stress of the combined planks, and the stress at the second edge 130b is twice the average stress. Since the failure of a structure is often dependent on the highest stress, the maximum shear stress at the first edge 130a can therefore limit the strength of this joint, and it is advantageous to modify the design to reduce the highest peak shear stress (specifically to reduce the stress at the first edge 130a). Embodiments of the present technology are directed to equalizing or at least approximately equalizing the product of E×T for overlapping planks with different materials having different elastic moduli in order to reduce the peak shear stress in the bond.

Figure 6F:
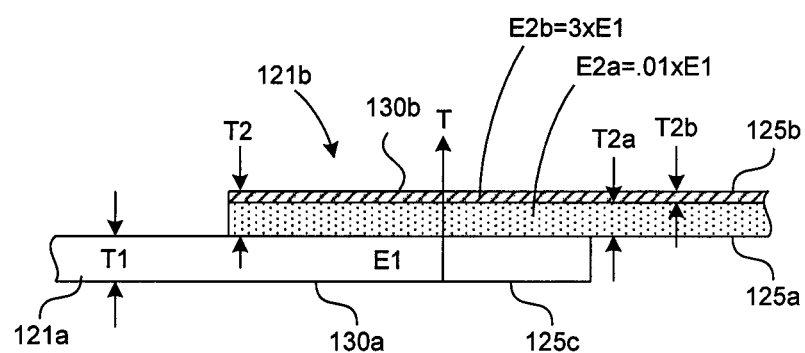
Figure 6G:
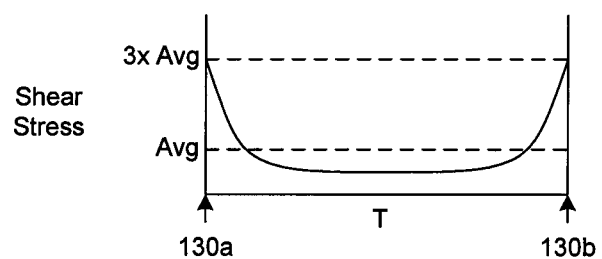

Referring now to FIG. 6F, the first plank 121a has a thickness T1 of 0.25 inches, and is formed from a single first layer 125c having an elastic modulus E1 of $10^7$ psi. Accordingly, E1×T1 equals $2.5×10^6$. The second plank 121b has a first layer 125a with a thickness T2a of 0.17 inches and an elastic modulus E2a of $10^5$ psi. The second plank 121b also includes a second layer 125b having a thickness T2b of 0.08 inches and an elastic modulus of $3×10^7$ psi. In one embodiment, the second layer 125b can be "above" the first layer 125a (in the orientation shown in FIG. 6F) and in other embodiments, it can be "below" the first layer 125a. In either embodiment, the foregoing elastic moduli are representative of unidirectional fiberglass (for E1), biaxial fiberglass (for E2a), and carbon fiber (for E2b). Accordingly, the biaxial fiberglass is more flexible than the unidirectional fiberglass, which is more flexible than the unidirectional carbon. The resulting composite product of elastic modulus and thickness for the second plank 121b, [(E2a×T2a)+(E2b×T2b)], is equal to 2.57×10$^6$ lb/in. This is approximately equal to the product of E1×T1 for the first plank 121a (e.g., approximately equal to 2.5×10$^6$). As discussed above, it is expected that this arrangement will equalize the shear stresses across the overlapped planks, as is shown in FIG. 6G. In particular, FIG. 6G illustrates that at both the first edge 130a and the second edge 130b, the shear stresses are approximately three times the average shear stress across the thicknesses of the overlapped planks, which is the same as in the case when the materials of 121a and 121b are the same. As was also discussed above, the thickness T2a of the first layer 125a is selected so that when added to the thickness T2b of the second layer 125b, the total thickness is the same as the thickness T1 of the first plank 125a. In addition, the elastic modulus E2a of the first layer 125a is selected to produce the composite product of elastic modulus and thickness described above, for example, an elastic modulus that is less than E1, to "compensate" for the elastic modulus E2b of the second layer 125b, which is greater than E1.

One feature of the foregoing arrangement is that the product of thickness and overall elastic modulus E of the first plank 121a can be at least approximately the same as the product of thickness and overall elastic modulus E of the second plank 121b, despite the difference in compositions of the two planks. In particular, the first layer 125a can operate as a "filler" for the second plank 121b so that the second plank 121b and the first plank 121a have approximately equal thicknesses. As used herein, the term "approximately" refers to thickness variations sufficiently small that they do not result in significant manufacturing problems or structural strength reduction due to the differences in thickness. In particular embodiments, representative thickness variations are with ±1 mm, or within ±10%, ±5%, ±2%, ±1%, or ±0.5% of the base thickness.

An advantage of the foregoing feature is that it can facilitate using high strength, low weight materials in particular portions of the wind turbine blade where the advantages of such materials outweigh the costs, without compromising or significantly compromising the strengths of the components that are joined in such a construction at the interfaces between such composites. This arrangement in turn can reduce or eliminate the likelihood that the blade will strike the tower on which it is carried, or undergo other unacceptable excursions under load, while maintaining a competitive blade cost.

Figure 7:
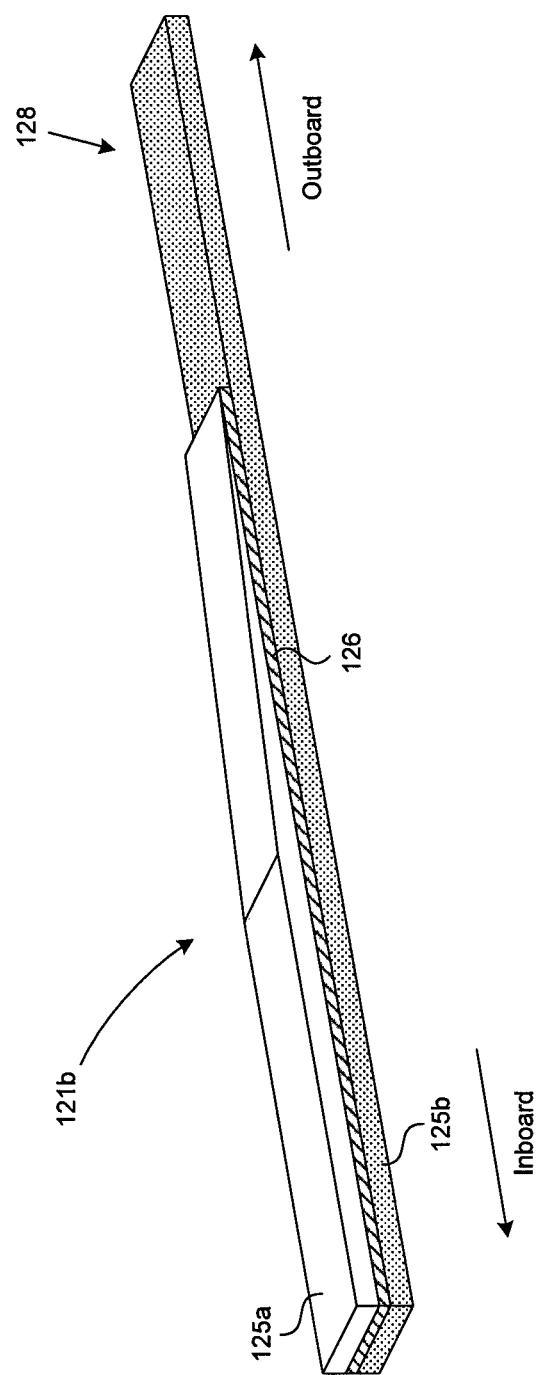
FIG. 7 is an enlarged isometric illustration of a portion of one of the planks shown in FIG. 6A.

While the equal thicknesses described above are desirable at the joint 119, at locations outboard from the joint 119, the thickness of the second plank 121b can be reduced by thinning or eliminating the first layer 125a, leaving the second layer 125b to carry the structural loads. FIG. 7 is a schematic side isometric illustration of an outboard portion of the second plank 121b, illustrating the first layer 125a tapering gradually and ending at an intermediate location 128 in accordance with a representative embodiment. Outboard of the intermediate location 128, the second plank 121b can include only the second layer 125b.

Figure 8:
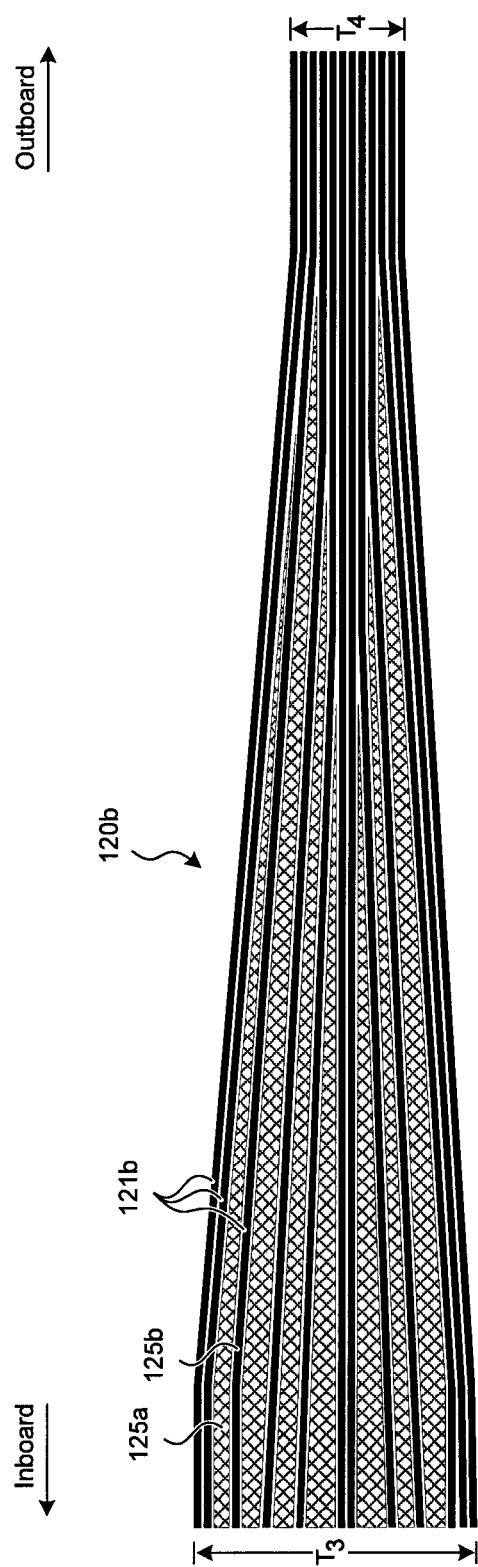
FIG. 8 is a partially schematic, side elevation view of selected layers of the spar element shown in FIG. 5.

FIG. 8 is a partially schematic side view the second spar element 120b that includes multiple second planks 121b. In general, each second plank 121b can include a first layer 125a and a second layer 125b. In some instances, adjacent second planks 121b can be bonded directly to each other. The first layer 125a between corresponding second layers 125b gradually tapers (e.g., to zero thickness, as described above with reference to FIG. 7) in an outboard direction so that adjacent second layers 125b become bonded directly to each other at further outboard locations of the second spar element 120b. Accordingly, the second spar elements 120b at outboard locations include only second layers 125b and no first layers 125a. The overall thickness of the second spar element 120b can taper from an initial thickness T3 to a final thickness T4, as shown in FIG. 8. In particular embodiments, some second layers 125b (e.g., those toward the upper and lower sides of the second spar element 120b) may be in direct contact with adjacent second layers over the length of the second spar portion 120b. For any given second plank 121b, the second layer 125b can be below the first layer 125a or "above" it, as discussed above with reference to FIG. 6G.

From the foregoing, it will be appreciated that specific embodiments of the present technology have been described herein for purposes of illustration, but that various modifications may be made without deviating from the technology. For example, several of the multi-constituent planks described above were described in the context of spar caps. In other embodiments, the same or similar techniques can be used to form other structures, e.g., other longitudinally extending structures, in a wind turbine blade. Certain aspects of the technology described in the context of particular embodiments may be combined or eliminated in other embodiments. For example, not all the spar caps of a particular wind turbine blade need include the foregoing arrangement of multi-constituent planks. Individual planks may be tapered in the manner described above with reference to FIG. 8, or may be untapered in other embodiments. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

We claim:

1. A wind turbine blade system, comprising:
   a first blade segment having a first spar element that includes first planks having a first thickness and a first plank composition; and
   a second blade segment having a second spar element that includes second planks having a second thickness and a second plank composition different than the first plank composition, the second blade segment being joined to the first blade segment at a joint, wherein an overall product of thickness and elastic modulus of the first planks is equal or approximately equal to an overall product of thickness and elastic modulus for the second planks.

2. The system of claim 1 wherein an individual second plank includes multiple layers, and wherein the overall product of thickness and elastic modulus for the second plank is equal to the sum of the product of thickness and elastic modulus for each layer of the second plank.

3. The system of claim 1 wherein individual first planks are interleaved with individual second planks at the joint.

4. A wind turbine blade system, comprising:
   first and second blade segments positioned at different locations along a longitudinal axis and joined together to form at least a portion of a wind turbine blade, the first blade segment including a first spar element and the second blade segment including a second spar element; wherein
   the second spar element is elongated along the longitudinal axis and includes multiple second planks, with individual second planks including at least one first layer having a first composition, at least one second layer having a second composition different than the first composition, and an adhesive between the first and second layers, the adhesive having an adhesive composition different than the first and second compositions; and wherein the first spar element is elongated along the longitudinal axis and includes multiple first planks, with individual first planks including at least one third layer having a third composition different than the first and second compositions: further wherein;

ends of the first planks and the second planks are interleaved to form a joint between the first and second spar elements:

at the joint, a thickness of an individual first plank is T1, a thickness of the first layer is T2$a$ and a thickness of the second layer is T2$b$, with T1 approximately equal to T2$a$+T2$b$;

an elastic modulus of the first composition is E2$a$, an elastic modulus of the second composition is E2$b$, and an elastic modulus of the third composition is E1; and (E1×T1) is approximately equal to (E2$a$×T2$a$)+(E2$b$×T2$b$).

5. The system of claim 4 wherein the first and second spar elements each include a spar cap.

6. The system of claim 4 wherein the first composition includes fiberglass and the second composition includes carbon fiber.

7. The system of claim 4 wherein at least one of the individual planks of the second spar element has an end and an intermediate location positioned outwardly along the longitudinal axis from the end, and wherein a thickness of at least one of the first and second layers of the at least one second plank is greater at the end than at the intermediate location.

8. The system of claim 4 wherein E2$b$ higher than E2.

9. The system of claim 4 wherein the first and second individual planks have approximately the same thickness.

10. A wind turbine blade system, comprising:
a first blade segment having a longitudinal axis, the first blade segment including at least one first spar element that is elongated along the longitudinal axis, the at least one first spar element including multiple first planks, with individual first planks having a first thickness T1 and a first elastic modulus E1; and
a second blade segment having at least one second spar element joined to the at least one first spar element at a spar joint and extending along the longitudinal axis, the at least one second spar element including multiple second planks joined to corresponding first planks at the spar joint, with individual second planks having a second thickness T2 and including at least one first layer having a first layer thickness T2$a$ and first composition with an elastic modulus of E2$a$, and at least one second layer having a second layer thickness T2$b$ and a second composition different than the first composition with an elastic modulus of E2$b$, and wherein (E1×T1) is equal or approximately equal to (E2$a$×T2$a$)+(E2$b$×T2$b$).

11. The system of claim 10 wherein the first planks include unidirectional fiberglass, the first composition includes biaxial fiberglass, and the second composition includes unidirectional carbon fibers.

12. The system of claim 10 wherein the first thickness T2$a$ of an individual first layer diminishes in a longitudinal direction outwardly away from the joint.

13. The system of claim 10, wherein the second blade segment has a first end inboard along the longitudinal axis from a second end and wherein the first layers terminate inboard of the second end.

14. A wind turbine blade, comprising:
a first blade segment having a first spar cap portion, the first spar cap portion including a plurality of laminated first planks, wherein individual first planks are formed from unidirectional fiberglass, have a first thickness, and terminate at different longitudinal locations to form a first end portion having a plurality of first projections and first recesses, with individual first projections alternating with individual first recesses along a thickness axis; and
a second blade segment having a second spar cap portion, the second spar cap portion including a plurality of laminated second planks, wherein individual second planks are formed from biaxial fiberglass strips attached to carbon strips, and terminate at different longitudinal locations to form a plurality of second projections and second recesses, with individual second projections alternating with individual second recesses along the thickness axis;
wherein the individual second planks have a second thickness the same or approximately the same as the first thickness at the corresponding second projections, and have a third thickness less than the second thickness at an intermediate location spaced apart from the corresponding second projections;
wherein a thickness of the biaxial fiberglass strips decreases to zero at the intermediate location; and
wherein individual second projections are received in corresponding first recesses, and individual first projections are received in corresponding second recesses, to join the first spar cap portion to the second spar cap portion: further wherein;
(E1×T1) is equal or approximately equal to (E2$a$×T2$a$)+(E2$b$×T2$b$), where;
E1=the elastic modulus of the unidirectional fiberglass;
E2$a$ =the elastic modulus of the biaxial fiberglass;
E2$b$ =the elastic modulus of the carbon;
T1=the thickness of the first planks;
T2$a$ =the thickness of the biaxial fiberglass strips; and
T2$b$ =the thickness of the carbon strips.

15. A method for manufacturing a wind turbine blade system, comprising:
selecting a first spar element of a first blade segment to include first planks having a first thickness and a first plank composition;
selecting a second spar element of a second blade segment to include second planks having a second thickness and a second plank composition different than the first plank composition;
sizing the first planks to join with the second planks;
selecting the first and second thicknesses, and the first and second compositions so that an overall product of thickness and elastic modulus of the first planks is approximately equal to an overall product of thickness and elastic modulus for the second planks; and
joining the first spar element and the second spar element by inserting first planks of the first spar element into recesses between second planks of the second spar element.

16. The method of claim 15, further comprising:
selecting individual second planks to have first layers with a first composition and a first layer thickness, and second layers with a second composition and a second layer thickness, the second composition being different than the first composition, and wherein the overall product of thickness and elastic modulus for the second planks is:

($E2a \times T2a$)+($E2b \times T2b$), where $E2a$=the elastic modulus of the first composition;
$E2b$=the elastic modulus of the second composition;
$T2a$=the thickness of the first layer; and
$T2b$=the thickness of the second layer.

17. The method of claim 15, further comprising selecting the first thickness of the first plank to be equal to the second thickness of the second plank.

* * * * *